Oct. 31, 1944.   E. I. BUTLER   2,361,743
FLEXIBLE CELL SUPPORT
Filed March 5, 1943   3 Sheets-Sheet 1

INVENTOR.
EDWIN I. BUTLER
BY
*George Douglas Jones*
ATTORNEY

Oct. 31, 1944. E. I. BUTLER 2,361,743
FLEXIBLE CELL SUPPORT
Filed March 5, 1943 3 Sheets-Sheet 2
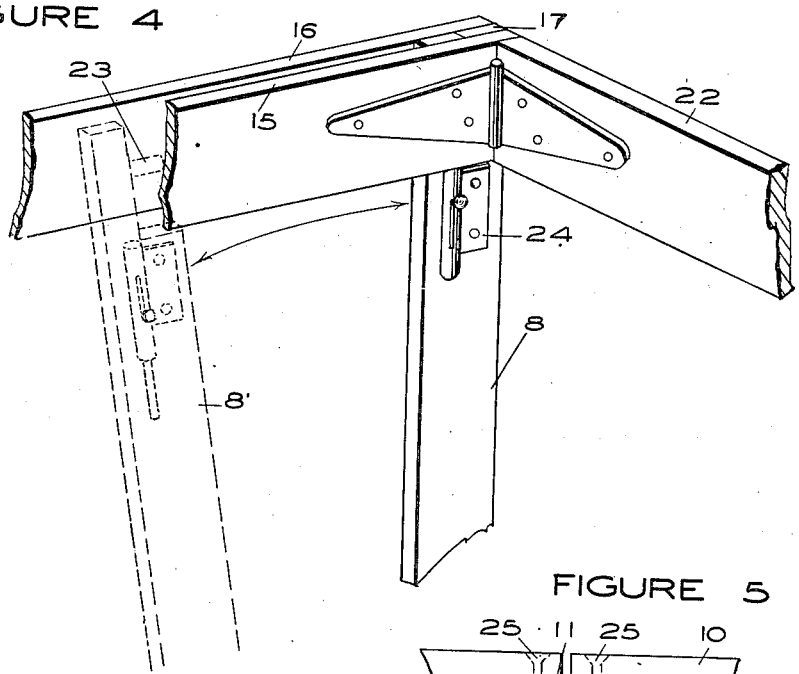
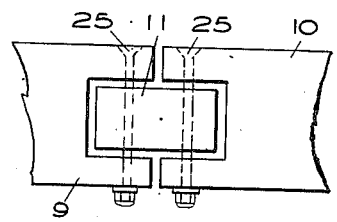
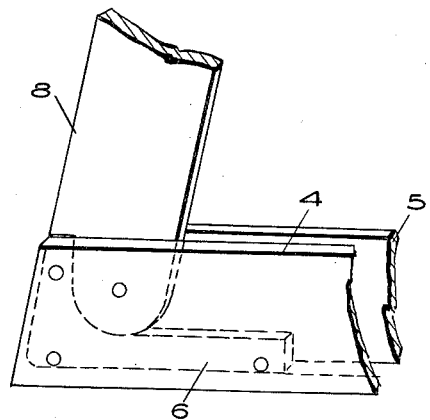
INVENTOR.
EDWIN I. BUTLER
BY George Douglas Jones
ATTORNEY Oct. 31, 1944.　　　　E. I. BUTLER　　　　2,361,743
FLEXIBLE CELL SUPPORT
Filed March 5, 1943　　　3 Sheets-Sheet 3

INVENTOR.
EDWIN I. BUTLER
BY
George Douglas Jones
ATTORNEY

Patented Oct. 31, 1944

2,361,743

UNITED STATES PATENT OFFICE 2,361,743

FLEXIBLE CELL SUPPORT

Edwin I. Butler, Baltimore, Md., assignor to The Glenn L. Martin Company, Middle River, Md., a corporation of Maryland Application March 5, 1943, Serial No. 478,125

3 Claims. (Cl. 150—49)

This invention relates to a frame designed to interiorly support a flexible-walled cell, particularly those flexible cells of natural or synthetic plastic materials for the transportation and storage of gasoline.

The use of a flexible-walled cell or tank, fabricated from one or more layers of plastic materials, has become almost universal in vehicles for the transportation and storage of fuel and oil. This type of fuel container is desirable in vehicles, in which the structures are subject to great stress and deflection. For example, in aircraft, it is common practice to store fuel in cavities in the wings of the plane. The deflection experienced by an airplane wing of current construction is well-known, so that it is obvious that the structural walls of the hollow spaces in the wings cannot be made sufficiently rigid to be liquid tight and retain gasoline. To install fabricated tanks in these cavities is objectionable for two reasons, first, any adequate storage tank would add unnecessary weight to the structure and, second, it is desirable to utilize every bit of space in the cavity for fuel storage. If a metal tank were built to occupy as much space as possible, it would then be subject to the stress of the deformation of the exterior structure.

The flexible-walled cell was developed to act as a container for fuel, the outer or side wall structure of the cavity functioning as the retainer for the fuel container, and bearing the pressure load.

This flexible-walled cell may be of varied construction. In its simpler form, it comprises one or more layers of impregnated fabric or sheets of natural or synthetic plastic materials which are flexible but inert to the action of any fuel that may be carried. Natural rubber and many of the so called synthetic rubbers or plastics have been used.

The cells used for military purposes are generally referred to as of the self-sealing type and consist of a plurality of layers of plastic material bonded together with an intermediate, relatively thick layer of crude rubber or Vistenex, an isobutene polymer. These materials when in contact with gasoline swell and seal a bullet hole.

While the cells are flexible, they are formed to fit a particular shape cavity. From the time they are removed from the fabricating moulds, to the time they are installed in the retaining cavity, they are subject to damage from mishandling. Some of the plastics used are subject to cold-flow and in the self-sealing cell, it is imperative to prevent cold flow of the inner and outer layers with a consequent distortion of the self-sealing layer.

To solve the above problems relating to the handling and servicing of these cells, the herein described support was developed.

An object of this invention is to provide a support for flexible-walled fuel cells to maintain their predetermined shape.

Another object of the invention is to provide a support construction which can be collapsed for insertion and removal through an access opening in the cell.

Another objection is the provision of a hinged supporting structure of light-weight, inexpensive but durable material.

The supporting frame of this invention maintains the shape of the plastic fabricated cell, to prevent cold-flow and other damage but will not, of itself, damage the cell.

By means of this invention, the cell may be suspended from a rack out of contact with all injurious materials and subject only to those stresses that it was designed to withstand.

A further object of this invention is the provision of a means for holding these flexible-walled fuel cells in position for service and repair.

Further and other objects will become apparent from the description of the accompanying drawings which form a part of this disclosure and in which like numerals refer to like parts.

In the drawings:

Figure 4 is a fragmentary view of the corner of the frame showing the corner assembly.

Figure 5 is a fragmentary view showing a detail of a hinge.

Figure 6 is a fragmentary view showing a lower corner of the frame.

Figure 1:
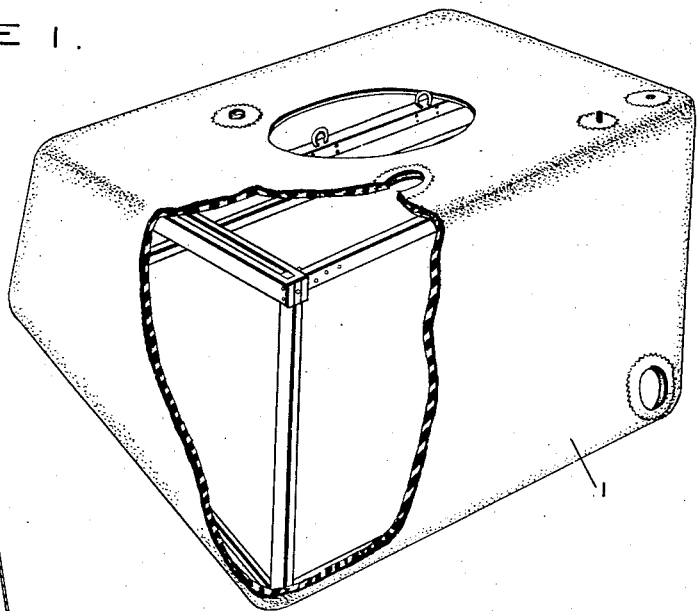
Figure 1 is a perspective view of the cell partly in section showing the supporting frame.

A flexible-walled cell or tank 1, is shown in Figure 1, supported by a frame which embodies this invention.

Figure 3:
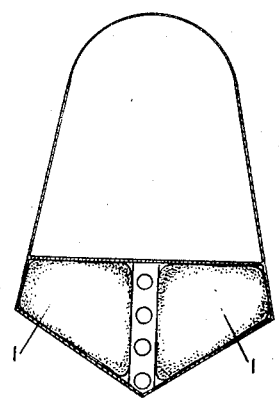
Figure 3 is a section through a seaplane hull showing the cell of Figure 1 installed.

The tank or cell shown in Figure 1, was selected for the purpose of describing one application of the invention, as it is the fuel tank of a flying boat hull. A pair of tanks are shown in the section through the hull in Figure 3. Due to its being formed to fit a particular shaped retaining structure, it is a particularly difficult article to handle in manufacture, shipping, storage, installation and service. This tank is approximately 4 feet square in plan and about 3 feet deep. The cell wall structure may be from a quarter to three quarters of an inch thick of natural or synthetic rubber. It is quite apparent that due to its shape, size and lack of self-support, this item presents many problems in handling.

Figure 2:
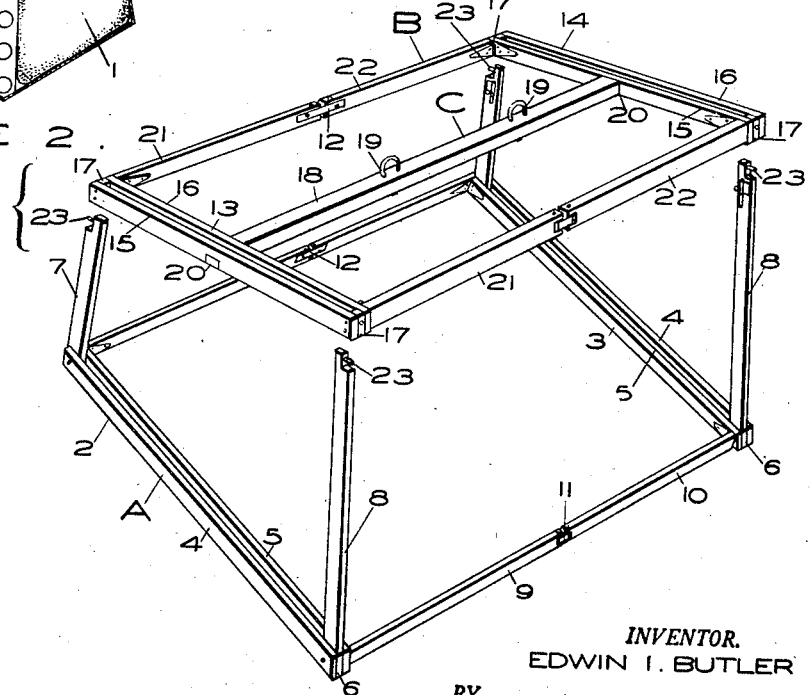
Figure 2 is a perspective view of the supporting frame.

The support or frame shown in Figure 2, consists of three pieces or assemblies generally indicated as A, B, and C.

The assembly A consists of a quadrilateral frame having similar side members 2 and 3, each comprising strips 4 and 5 spaced by blocks 6, to permit members 7 and 8 to be pivoted therebetween (see Figure 6). Members 9 and 10 are hinged to block 11 and to members 5 so that they may fold inwardly against members 2 and 3. The hinge construction of Figure 5 is employed to make it possible to fold members 9 and 10, and 2 and 3 into a compact arrangement shown in Figure 8. Members 7 and 8 pivot about one end and may be collapsed into the space between members 4 and 5. In the particular installation, it should be noted that the axis of the hinge between members 3 and 10, and 2 and 9 are arranged to permit the folding of these members in the same plane. From the drawings, it will be seen that the quadrilateral frame with the four up-right supporting members can be folded into a compact bundle shown in Figure 8. The double hinge 11 between members 9 and 10 may be reinforced by a hook strap 12.

Figure 9:
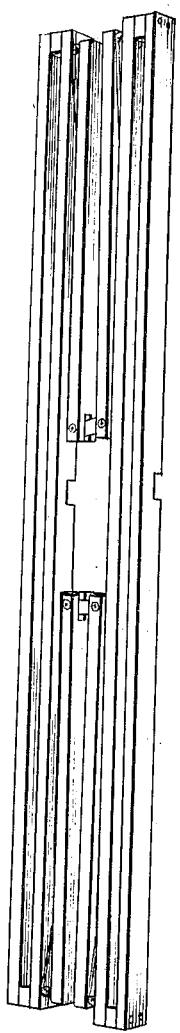
Figure 9 shows the top assembly collapsed.
Figure 10:
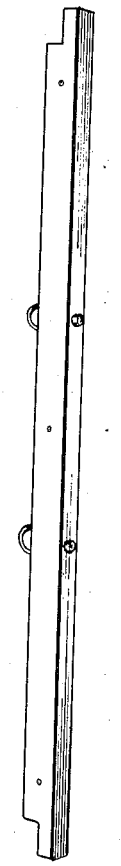
Figure 10 shows the frame support assembly.
Figure 7:
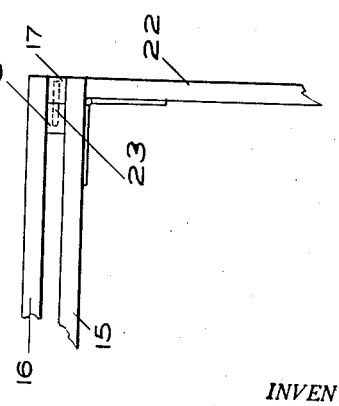
Figure 7 is a fragmentary view showing a detail of an upper corner.

A quadrilateral frame indicated as assembly B consists of members 13 and 14, each of similar construction to members 2 and 3, consisting of spaced strips 15 and 16 and spacer blocks 17. The fastening and folding mechanism is similar to that described for the quadrilateral frame of assembly A. This frame is illustrated in its folded position in Figure 9. The assembly indicated as C is shown in Figure 10, consists of a bar 18 having eye bolts 19 secured thereto. This bar is designed to fit into notches 20 in the frame B.

Figure 4 shows a detail that is typical of any of the top corners. The upper end of member 8 slides into position between members 15 and 16 spaced by block 17 having a hole positioned to receive pin 23 on member 8. These pins prevent assembly A from pulling away from assembly B when lifted by assembly C. A latching means indicated by 24, which may be a bolt or any equivalent structure, secures member 8 from inadvertently pivoting to the position shown as 8'.

Figure 5 shows an enlarged view of a double hinge mechanism that permits members 9 and 10 to double back and collapse flat on one another. The block 11 is pivotally secured by pins 25 in notched ends of members 9 and 10.

Figure 6 shows in detail the spacing of members 4 and 5 by block 6 to permit and facilitate the pivoting of member 8. The structure shown is required due to the odd angle at the corner of the particular cell used for illustrating the invention, but the construction is adaptable to any type cell that may need to be supported.

Of the many materials that may be used in the construction of this frame, plywood is preferred due to its relatively high strength, low cost and ease of fabrication. Metal, of course, could be used, but would only be considered where it might be desired to leave the frame in the cell, when the cell is filled with the liquid. Many of the sheet plastic materials are easily fabricated and could readily be used.

Figure 8:
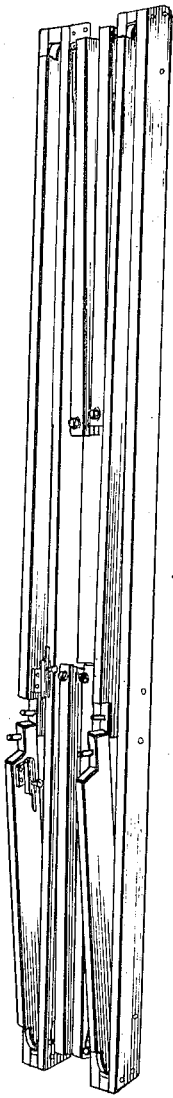
Figure 8 shows the bottom assembly collapsed.

In operation, the folded assembly A shown in Figure 8, is inserted through the access opening in the cell, oriented, and then the quadrilateral frame extended and secured by the strap hooks 12. Assembly B, Figure 9, is then similarly positioned in the cell. The spacers 7 and 8 are pivoted into place to hold the quadrilateral frames spaced properly and the corners are secured in the manner described in connection with Figure 4. Assembly C is then inserted and secured in the notches in assembly B. It will be noted that the notches for bar C will be located approximately in the plane of the center of gravity of the assembly.

The cell is thus fully extended and supported in its predetermined shape, but the frame can be handled quite readily and crated for shipping.

In field service, at the operation bases, where it is necessary to remove the cells from the retaining structure for service and repair, the frame may be inserted in the cell when removed from the craft and the cell suspended from a rack for repair. The cell will be out of possible danger until it is desired to re-install it in the sea plane.

The above description of the invention is intended to set out a single embodiment of the invention which is essentially the frame to support the cell. It is obvious that the cell herein described could be adapted to any of the many shapes now in use with the same advantages, in any type of vehicle.

It is to be understood that certain changes, alterations, modifications and substitutions can be made without departing from the spirit and scope of the appended claims.

I claim:

1. An articulated frame structure adapted to conform with the internal dimensions of a flexible-walled fuel cell having an access opening in one side thereof, said structure comprising members forming two quadrilateral frames, conforming with the internal dimensions of opposite cell walls, each of said quadrilateral frames having two end members each having a slot formed therein extending substantially the length of said member, side members extending between the ends of said end members and hingedly secured thereto at the end thereof, to form a quadrilateral frame, said side members being hinged intermediate the ends to permit folding of said frame, spacer members pivotally secured to said end members at the ends thereof and adapted to fold within said slots, a second quadrilateral frame of substantially the same construction as said first mentioned form, having similar slots adapted to receive and retain the ends of said spacer members to form said supporting structure for said flexible walled cell.

2. An articulated frame structure adapted to conform with the internal dimensions of a flexible-walled fuel cell having an access opening in one side thereof, said structure comprising members forming two quadrilateral frames, conforming with the internal dimensions of opposite cell walls, each of said quadrilateral frames having two end members each having a slot formed therein extending substantially the length of said member, side members extending between the ends of said end members and hingedly secured thereto, to form a quadrilateral frame, said side members being hinged intermediate the ends to permit folding of said frame, spacer members pivotally secured to said end members at the ends thereof and adapted to fold within said slots, a second quadrilateral frame of substantially the same construction as said first mentioned form, having similar slots adapted to receive and retain the ends of said spacer members to form said supporting structure for said flexible walled cell, a supporting member adapted to engage said end members, so positioned as to extend across the access opening in the cell wall and means on said supporting member whereby the frame and cell may be lifted.

3. An articulated frame structure adapted to conform with the internal dimensions of a flexible-walled fuel cell having an access opening in one side thereof, said structure comprising members forming two quadrilateral frames, conforming with the internal dimensions of opposite cell walls, each of said quadrilateral frames having two end members each having a slot formed therein extending substantially the length of said member, side members extending between the ends of said end members and hingedly secured thereto, to form a quadrilateral frame, said side members being hinged intermediate the ends to permit folding of said frame, spacer members pivotally secured to the ends of said end members and adapted to fold within said slots, a second quadrilateral frame of substantially the same construction as said first mentioned form, having similar slots adapted to receive and retain the ends of said spacer members to form said supporting structure for said flexible walled cell, a supporting member adapted to engage said end members so positioned as to extend across the access opening and lie substantially in a vertical plane with the center of gravity of the frame and cell assembly, means on said supporting member whereby the frame and cell assembly may be lifted.

EDWIN I. BUTLER.